United States Patent [19]

Jinkens

[11] Patent Number: 4,995,678
[45] Date of Patent: Feb. 26, 1991

[54] PROTECTED PIN RETENTION DEVICE FOR CRAWLER TRACK ASSEMBLY

[75] Inventor: Joseph A. Jinkens, New Albany, Ohio

[73] Assignee: Matsuhita Electric Industrial Co., Ltd., Osaka, Japan

[21] Appl. No.: 287,078

[22] Filed: Dec. 20, 1988

[51] Int. Cl.⁵ .......................................... B62D 55/205
[52] U.S. Cl. ..................................... 305/58 R; 305/39
[58] Field of Search ............ 305/36, 39, 58 R, 58 PC, 305/41, 42, 43

[56] References Cited

U.S. PATENT DOCUMENTS

| | | | |
|---|---|---|---|
| 2,314,355 | 3/1943 | Knox | 305/42 X |
| 2,430,573 | 11/1947 | Krotz | 305/59 X |
| 2,780,830 | 2/1957 | Kammerer, Jr. | 305/58 R X |
| 3,096,661 | 7/1963 | Reinsma et al. | 74/258 |
| 3,659,112 | 4/1972 | Stedman | 305/58 |
| 4,139,240 | 2/1979 | Profio et al. | 305/39 |
| 4,181,035 | 1/1980 | Shockley | 74/250 |
| 4,433,874 | 2/1984 | Melvin | 305/58 R X |

FOREIGN PATENT DOCUMENTS

| | | | |
|---|---|---|---|
| 814545 | 6/1937 | France | 305/58 R |
| 0742240 | 6/1980 | U.S.S.R. | 305/58 R |
| 8002059 | 10/1980 | World Int. Prop. O. | 305/58 PC |

OTHER PUBLICATIONS

1-Page Shop Drawing of Model 1036 Continuous Miner, Jeffrey Division of Dresser Industries, Apr. 23, 1979.
Pages TJM-1235 and TJM-1245 of 12CM Continuous Miner Technical Service Manual, Joy Mfg. Co., Dec. 1979.

Primary Examiner—Russell D. Stormer
Attorney, Agent, or Firm—Wenderoth, Lind & Ponack

[57] ABSTRACT

An articulated endless track for a mobile machine has a plurality of crawler pads connected in series. Each adjacent pair of pads has spaced apart hinge knuckles engaged in alternating fashion to form a hinge pin chamber. Each chamber contains a hinge pin positioned between a pair of retention elements. Each retention element is secured to its associated encircling hinge knuckle. This arrangement protects the retention elements against abrasion while permitting assembly or disassembly of the track to be accomplished readily.

11 Claims, 2 Drawing Sheets

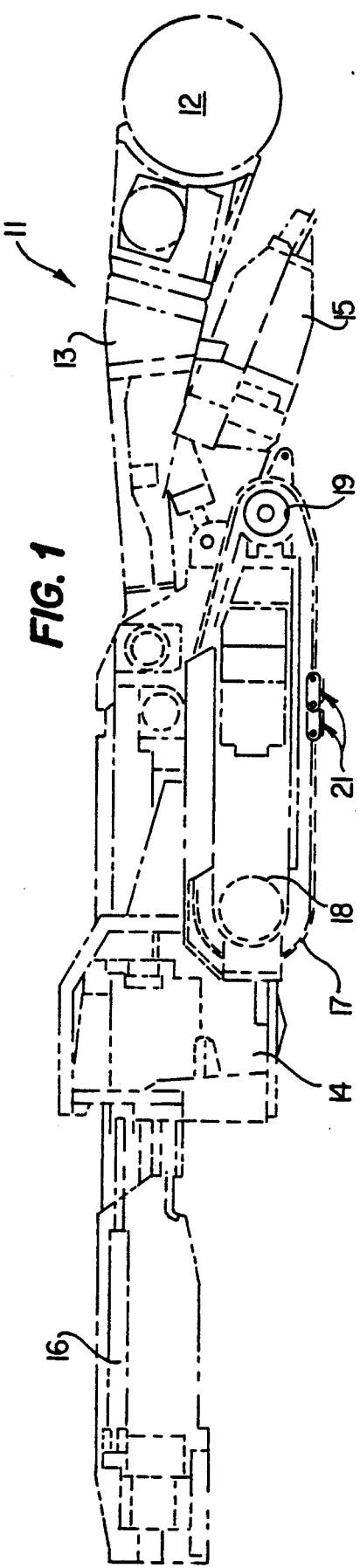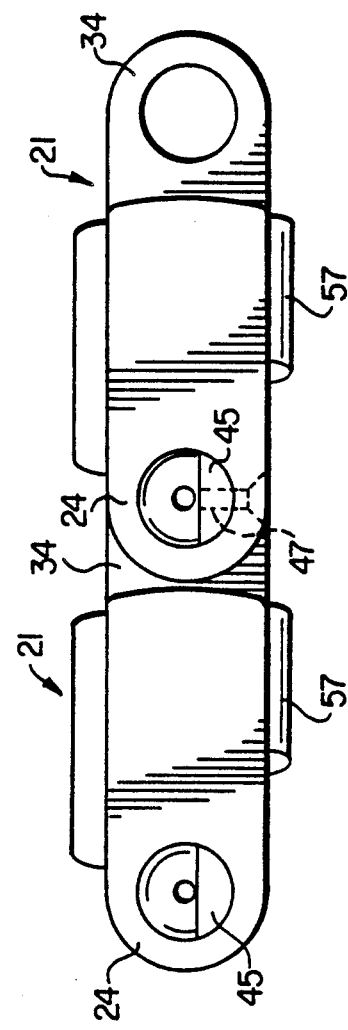

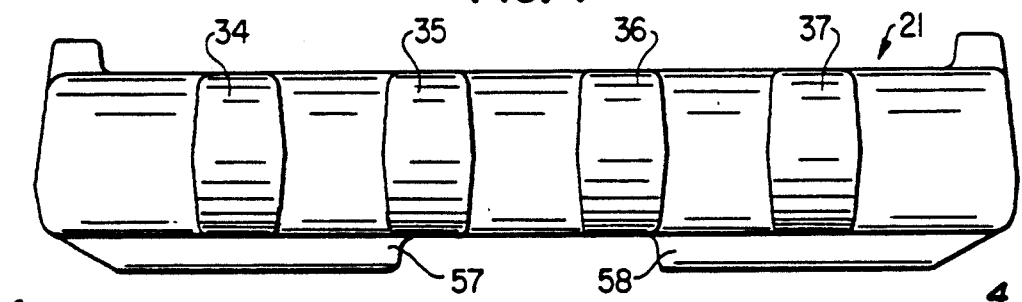
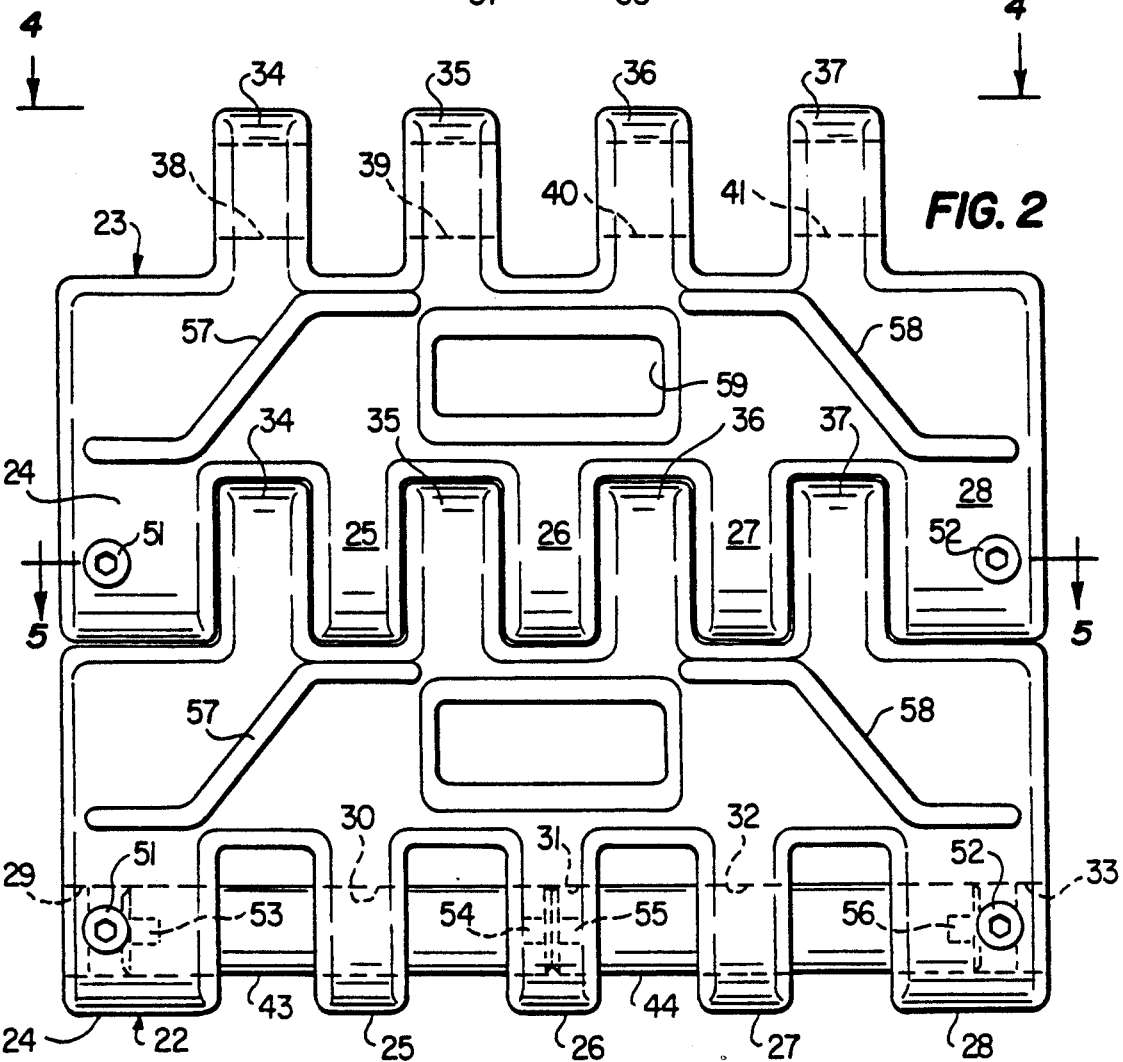
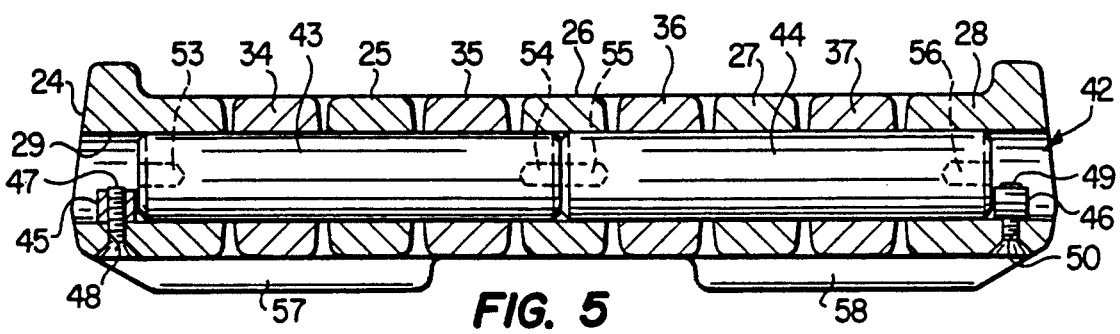

PROTECTED PIN RETENTION DEVICE FOR CRAWLER TRACK ASSEMBLY

FIELD OF THE INVENTION

This invention relates to articulated endless track assemblies, such as used on mobile mining machinery to move the machinery from one location to another. In one aspect the invention relates to means for retaining the track hinge pins in place and means for protecting the retaining means against abrasive contact with the ground during movement of the track. In another aspect, the invention relates to means for readily assembling or disassembling the track in a confined area.

BACKGROUND OF THE INVENTION

An articulated endless track for track-type vehicles comprises a plurality of crawler pads connected in series with each other, with each pair of adjacent pads being pivotally joined together by means of a hinge pin. If the hinge pin is retained in place by being press fitted into bushings in one of the pair of adjacent pads, it can be difficult to remove the pin in a confined area such as an underground mine. If the pin is not secured to either pad, then means must be provided to retain the pin in place. One commercial retention technique utilizes two coaxially aligned hinge pins in each hinge connection of two crawler pads in an articulated endless track, the ends of the pins at the center of the track being exposed, and a lock pin being secured in a hole cross-drilled in the exposed inner end of each hinge pin. However, these lock pins are located such that they are exposed to the high-wear operating environment. Another commercial retention technique employs a screw/lock nut arrangement on each side of the track. The screw is located in a flange which extends outwardly from the side of the crawler pad so that the nut is positioned adjacent the end of the hinge pin. However, because of their exposed locations on the side edges of the crawler tread, the retention nuts are subjected to the high wear environment.

It is therefore an object of the invention to provide means for retaining rotatable hinge pins in place in a crawler tread assembly, the retaining means having minimum exposure to wear. It is an object of the invention to have hinge pin retention means in a crawler tread assembly which can be readily removed, along with the hinge pins, even in confined areas. Another object of the invention is to minimize the abrasive wear on the hinge pin retention means in an articulated endless track assembly on mobile machinery.

Other aspects, objects, and advantages of the invention will be apparent from the following description and the accompanying drawings.

SUMMARY OF THE INVENTION

In accordance with the present invention, the length of a hinge pin and its associated pair of retention elements does not exceed the length of the hinge pin chamber formed by the joinder of a pair of crawler pads, such that two retention elements are placed inside the chamber with the hinge pin positioned between them and each retention element is releasably secured to the surrounding adjacent portion of the crawler pad. In one embodiment each retention elements is a cylinder or cylindrical segment having a diameter only slightly less than the diameter of the hinge pin chamber, and having a threaded opening extending radially therethrough for securing to the crawler pad by means of a bolt.

BRIEF DESCRIPTION OF THE DRAWINGS

FIG. 1 is a schematic side elevation view of a continuous mining machine, including an articulated endless track for moving the machine from one location to another;

FIG. 2 is a plan view of the earth contact side of a pair of interconnected crawler pads;

FIG. 3 is a side elevation view, corresponding to FIG. 1, of the pair of interconnected crawler pads;

FIG. 4 is an end elevation view of the trailing edge of one of the crawler pads; and FIG. 5 is an elevation view in cross-section taken along line 5—5 in FIG. 2.

DETAILED DESCRIPTION

Referring now to the drawings in detail and to FIG. 1 in particular, the continuous mining machine 11 has a rotary auger 12 supported by arm 13 from the front of a mobile chassis or frame 14. The auger 12 engages the mine face to cut ore from the mine face. An uptake conveyor 15 and a delivery conveyor 16 move the mined material from the mine face to the rear of the mining machine for delivery into suitable vehicles or other conveyor means for removing the material from the mine. On each side of the chassis 14, an endless track assembly 17 is mounted on a drive sprocket 18 and an idler sprocket 19 to provide means for moving the mining machine 11 from one place to another along the mine passageway. Each track assembly 17 comprises a plurality of essentially identical crawler pads 21 connected in series with each other by hinge pins to form the endless track.

Referring now to FIGS. 2-5, each crawler pad 21 has a leading or forward edge portion 22 and a trailing or rear edge portion 23, when viewed with the machine moving ahead. Each leading edge portion 22 has five spaced apart leading hinge knuckles 24, 25, 26, 27, and 28 which extend parallel to each other and the direction of movement of the track. Each knuckle 24-28 has a bore 29, 30, 31, 32, and 33, respectively, extending therethrough perpendicular to the direction of movement of the track. The bores 29-33 are at least generally cylindrical in shape, and on an individual crawler pad are coaxially aligned with each other.

The trailing edge portion 23 of each crawler pad 21 has four spaced apart trailing hinge knuckles 34, 35, 36 and 37 which extend parallel to each other and the direction of movement of the track. Each knuckle 34-37 has a respective bore 38, 39, 40 or 41 extending therethrough perpendicular to the direction of movement of the track. Bores 38-41 are at least generally cylindrical in shape and have essentially the same diameter as bores 29-33. On an individual crawler pad, bores 38-41 are coaxially aligned with each other. Hinge knuckles 24-28 are laterally offset from hinge knuckles 34-37 on an individual crawler pad such that the hinge knuckles 34-37 on the trailing edge of one crawler pad interleave or alternate with the hinge knuckles 24-28 on the leading edge of the next following crawler pad, as shown in FIG. 2. When the leading knuckles 24-28 of one crawler pad are in engagement with trailing knuckles 34-37 of another crawler pad, bores 29-33 and bores 38-41 are positioned in coaxial alignment with each other, forming a substantially cylindrical chamber 42 extending through the engaged set of leading and trailing hinge knuckles.

Two hinge or pivot pins 43 and 44, each having a diameter slightly smaller than the minimum effective diameter of chamber 42, are rotatably positioned in chamber 42 in coaxial alignment with each other. Hinge pins 43 and 44 serve as a pivot pin for the engaged pair of crawler pads, permitting each of the crawler pads to hinge about the hinge pins. The total length of hinge pins 43 and 44 is less than the length of chamber 42 along its longitudinal axis, permitting threaded retention nuts 45 and 46 to be positioned completely within chamber 42 with hinge pins 43 and 44 therebetween. Retention nut 45 is completely encircled by hinge knuckle 24, while retention nut 46 is completely encircled by hinge knuckle 28. Each of nuts 45 and 46 is a cylindrical segment, with the diameter of the cylindrical surface being substantially equal to, but slightly smaller than the minimum diameter of bores 29 and 33. Each of nuts 45 and 46 has a threaded hole extending radially therethrough. A threaded bolt 47 is positioned in hole 48 in hinge knuckle 24 such that bolt 47 extends into threaded engagement with retention nut 45. Similarly, a threaded bolt 49 is positioned in hole 50 in hinge knuckle 28 such that bolt 49 extends into threaded engagement with retention nut 46. Holes 48 and 50 are enlarged at the outer ends thereof to permit the heads 51, 52 of bolts 47, 49 to be flush with or recessed below the outer surface of the respective hinge knuckle. The correspondingly curved surfaces of chamber 42 and nuts 45 and 46 permit greater loading contact between nuts 45, 46 and knuckles 24, 28, respectively, when nuts 45, 46 are tightened on bolts 47, 49.

Hinge pin 43 has a threaded hole 53, 54 in each end thereof while hinge pin 44 has a threaded hole 55, 56 in each of its ends. Threaded holes 53, 54, 55 and 56 are sized to be engaged by a threaded male element of various tools commonly found in mines. Such threaded engagement permits the hinge pin to be readily pulled from its chamber 42 after at least one of the retention nuts 45, 46 has been removed. Each crawler pad has a pair of grouser rib elements 57 and 58 extending outwardly therefrom o engage the earth when that crawler pad is in contact with the earth surface. Each crawler pad has an opening 59 therethrough to permit the teeth of the drive sprocket 18 and idler sprocket 19 to engage the crawler pad.

While the invention has been illustrated in terms of a specific embodiment, it is also applicable to many other embodiments. The retention elements can be a full cylinder instead of a cylindrical segment. A single hinge pin can be utilized for each set of engaged knuckles instead of the set of two coaxial pins illustrated. The number of knuckles on the leading and trailing edges of a crawler pan can vary.

I claim:

1. A crawler pad assembly comprising first and second crawler pads;

each of said crawler pads having a leading edge portion and a trailing edge portion, the leading edge portion of each crawler pad having a plurality of spaced apart first hinge knuckles extending parallel to each other, each of said first hinge knuckles having a first bore extending therethrough, the first bores of a respective crawler pad being at least substantially cylindrical and coaxially aligned with respect to each other;

the trailing edge portion of each crawler pad having a plurality of spaced apart second hinge knuckles extending parallel to each other, each of said second hinge knuckles having a second bore extending therethrough, the second bores of a respective crawler pad being at least substantially cylindrical and coaxially aligned with respect to each other, the plurality of spaced apart first hinge knuckles on a respective crawler pad extending parallel to and offset from the plurality of spaced apart second hinge knuckles on the same crawler pad;

the plurality of spaced apart first hinge knuckles of said first crawler pad being engaged in alternating relationship with the plurality of spaced apart second hinge knuckles of said second crawler pad, with the first bores of said first crawler pad being coaxially aligned with the second bores of said second crawler pad to form a substantially cylindrical chamber extending through the thus engaged first and second hinge knuckles;

at least one substantially cylindrical hinge pin positioned in said substantially cylindrical chamber to thereby pivotally connect said first and second crawler pads;

first and second retention elements positioned in said substantially cylindrical chamber such that each said retention element is completely encircled by a hinge knuckle to protect the respective retention element against abrasive contact with the ground during movement of the crawler pad assembly and said at least one hinge pin is located between said first and second retention elements and is retained within said substantially cylindrical chamber by said first and second retention elements, the total longitudinal length of said at least one hinge pin and said first and second retention elements not exceeding the longitudinal length of said substantially cylindrical chamber;

first means for securing said first retention element to a hinge knuckle completely encircling said first retention element; and second means for securing said second retention element to a hinge knuckle completely encircling said second retention element.

2. A crawler pad assembly according to claim 1 wherein each of said first and second retention elements is a threaded nut, and each of said first and second means for securing is a threaded bolt extending from adjacent the outer periphery of the respective encircling hinge knuckle into threaded engagement with the associated nut.

3. A crawler pad assembly in accordance with claim 2 wherein each said bolt has a head which is recessed within the respective encircling hinge knuckle.

4. A crawler pad assembly in accordance with claim 3 wherein at least a portion of the outer surface of each said nut is a portion of a cylindrical surface with the diameter of the cylindrical surface being slightly smaller than the effective diameter of the bore in the respective encircling hinge knuckle which is part of said substantially cylindrical chamber.

5. A crawler pad assembly in accordance with claim 4 wherein said at least one hinge pin comprises a plurality of hinge pins coaxially aligned with each other within said substantially cylindrical chamber.

6. An articulated endless track assembly comprising a plurality of crawler pads positioned in series to form an endless track;

each of said crawler pads having a leading edge portion and a trailing edge portion, the leading edge portion of each crawler pad having a plurality of spaced apart first hinge knuckles extending parallel to each other and to the length of said track, each of said first hinge knuckles having a first bore extending therethrough, the first bores on a respective crawler pad being at least substantially cylindrical and coaxially aligned with respect to each other;

the trailing edge portion of each crawler pad having a plurality of spaced apart second hinge knuckles extending parallel to each other and the length of said track, each of said second hinge knuckles having a second bore extending therethrough, the second bores on a respective crawler pad being at least substantially cylindrical and coaxially aligned with respect to each other, the plurality of spaced apart first hinge knuckles on a respective crawler pad extending parallel to and offset from the plurality of spaced apart second hinge knuckles on the same crawler pad;

the plurality of spaced apart first hinge knuckles of each individual crawler pad being engaged in alternating relationship with the plurality of spaced apart second hinge knuckles of an adjacent individual crawler pad with the respective first and second bores thereof being coaxially aligned with each other to form in each thus engaged set of first and second hinge knuckles a substantially cylindrical chamber extending through the respective set of engaged first and second hinge knuckles;

a plurality of hinge pin means corresponding in number to the number of engaged sets of first and second hinge knuckles, each hinge pin means being positioned in a respective substantially cylindrical chamber to thereby pivotally connect the respective pair of crawler pads;

a plurality of first and second retention elements, with each substantially cylindrical chamber having a first retention element and a second retention element positioned therein such that each said retention element is completely encircled by a hinge knuckle to protect the respective retention element against abrasive contact with the ground during movement of the track assembly and each hinge pin means is located between a respective first retention element and a respective second retention element and is retained within the respective substantially cylindrical chamber by the respective first and second retention elements, the total longitudinal length of each said hinge pin mans and its associated pair of retention elements being no greater than the longitudinal length of the respective substantially cylindrical chamber;

a plurality of first and second fastening means, each first fastening means securing a respective first retention element to a hinge knuckle completely encircling the respective first retention element and each second fastening means securing a respective second retention element to a hinge knuckle completely encircling the respective retention element.

7. An articulated endless track retention assembly according to claim 6 wherein each said first retention element and each said second retention element is a threaded nut, and each said first and second fastening means is a threaded bolt extending from adjacent the outer periphery of the respective encircling hinge knuckle into threaded engagement with the associated nut.

8. An articulated endless track assembly in accordance with claim 7 wherein each said nut is a cylindrical segment with the diameter of the cylindrical surface thereof being slightly smaller than the effective diameter of the bore in the respective encircling hinge knuckle which is part of the respective substantially cylindrical chamber.

9. An articulated endless track assembly in accordance with claim 7 wherein each said bolt has a head which is recessed within the respective encircling hinge knuckle.

10. An articulated endless track assembly in accordance with claim 9 wherein at least a portion of the outer surface of each said nut is a portion of a cylindrical surface with the diameter of the cylindrical surface being slightly smaller than the effective diameter of the bore in the respective encircling hinge knuckle which is part of the respective substantially cylindrical chamber.

11. A crawler pad assembly in accordance with claim 10 wherein each said hinge pin means comprises a plurality of hinge pins coaxially aligned with each other within each respective substantially cylindrical chamber.

* * * * *

UNITED STATES PATENT AND TRADEMARK OFFICE
CERTIFICATE OF CORRECTION

PATENT NO.  : 4,995,678
DATED       : February 26, 1991
INVENTOR(S) : Joseph A. Jinkens It is certified that error appears in the above-identified patent and that said Letters Patent is hereby corrected as shown below:

On the cover sheet, delete the designation of the Assignee as "Matsuhita Electric Industrial Co., Ltd., Osaka, Japan" and insert --Dresser Industries, Inc., Dallas, Texas--.

On the cover sheet, delete the designation of the Attorney, Agent, or Firm as "Wenderoth, Lind & Ponack".

Column 3, line 43, change "o" to --to--.

Column 6, line 5, change "mans" to --means--.

Signed and Sealed this

Twenty-seventh Day of April, 1993

Attest:

MICHAEL K. KIRK

*Attesting Officer*    Acting Commissioner of Patents and Trademarks